Aug. 28, 1962   J. H. JEFFREE   3,051,051
OPTICAL JUSTIFYING MEANS
Filed July 7, 1959
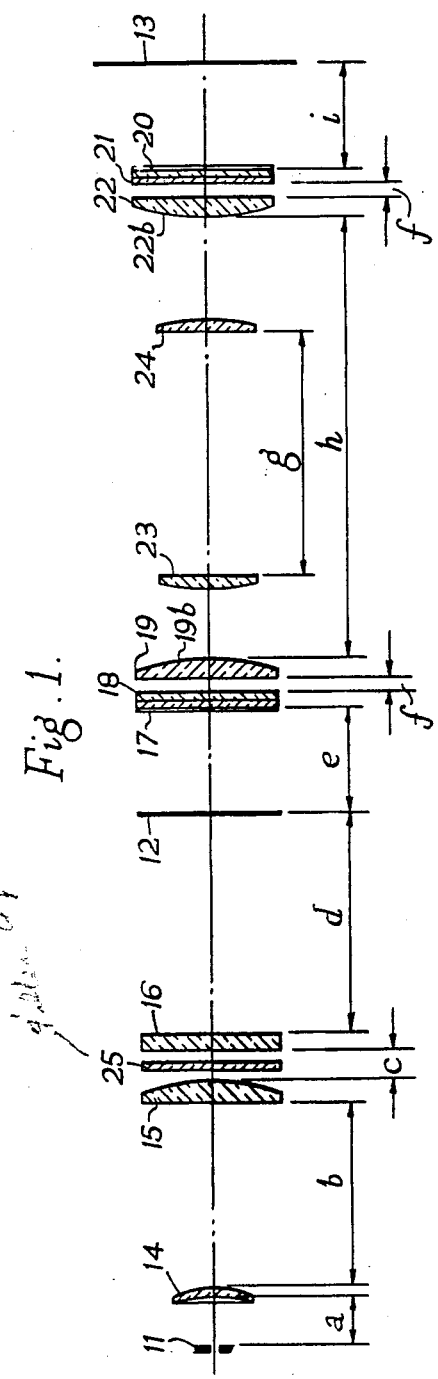
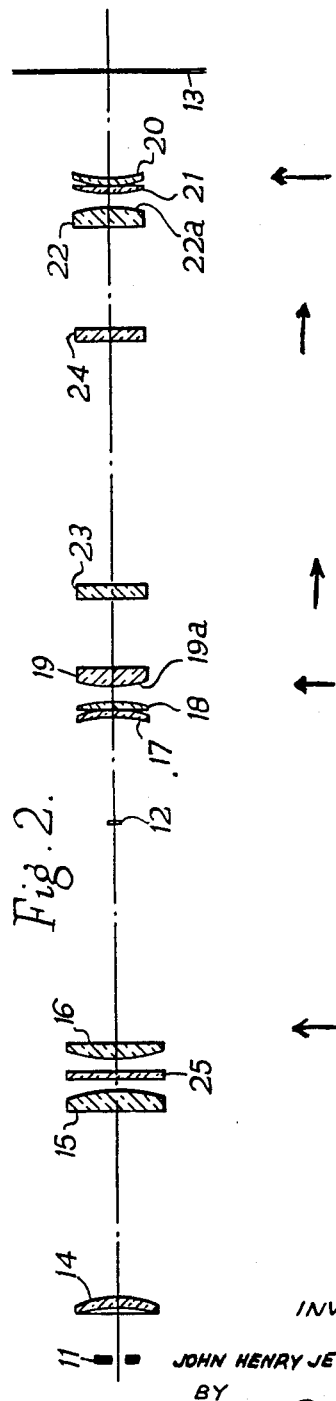
INVENTOR
JOHN HENRY JEFFREE
BY
Estabrook + Philpitt
ATTORNEYS ન
3,051,051
OPTICAL JUSTIFYING MEANS
John Henry Jeffree, London, England, assignor to CAPS Limited, London, England
Filed July 7, 1959, Ser. No. 825,524
Claims priority, application Great Britain July 11, 1958
7 Claims. (Cl. 88—57)

This invention relates to optical means for justifying lines of characters to be projected onto a surface, for example, the light-sensitive surface of a film or printing plate and to optical projection systems including such justifying means.

In photographic type composing apparatus lines of characters formed on a radiation sensitive film require to be adjusted to a set length. Thus certain lines will normally require stretching or lengthening and it is possible that some lines may require shortening. The process of lengthening or shortening lines is generally referred to as "justifying."

It is an object of the invention to provide a simple and effective optical means for justifying lines of characters by magnification in direction of the length of the line only.

The justifying means of the invention consists of an imaging lens system which is positioned between the line of characters to be justified and the surface onto which the lines are to be projected and comprises two similar series of cylindrical lenses which together image the line of characters on the film or printing plate in direction of line height, the axes of the lenses being parallel to the length of the line of characters, and between the said two series of cylindrical lenses, a third series of cylindrical lenses which have their axes perpendicular to the length of line and image the line in direction of line length, the whole or part of the intermediate series of cylindrical lenses being movable, preferably as a fixed group, towards or away from the line of characters to vary the magnification of the line on the film or printing plate in the direction of the length of the line only. The term "lens" as used herein includes a lens surface and lenses having two lens surfaces may be used. For example, one lens surface of a crossed cylindrical lens may operate as a lens of one of the outer series of lenses and the other lens surface may operate as a lens of the intermediate series of lenses. The movement of the intermediate series of lenses or part thereof may take place along the axis of the system for symmetrical magnification relative to the axis or along a line inclined to the axis for magnification which is unsymmetrical relative to the axis.

The term "magnification" as used herein includes both positive and negative magnification.

Light for projecting the line of characters onto a film or printing plate may be of monochromatic or nearly monochromatic character such as a near ultra violet of wave length approximately 3650 angstrom from a mercury arc. A filter such as a piece of nickel glass may be used to pass light of this character.

In accordance with a feature of the invention the condenser lens system for collecting the light and rendering it approximately parallel in direction of line length while focussing it in direction of line height into a narrow strip onto the line of characters consists of two positive lenses with spherical curves, respectively a meniscus lens and a plano-convex lens, focussing light from the light source to give an approximately parallel beam, followed by a cylindrical lens, plano-convex, with its axis parallel to the length of the line, focussing light in direction of line height into a narrow strip.

In the condensing and imaging system of the invention the light from the light source is rendered approximately parallel in direction of line length by the condenser system, and so passes through the said two series of cylindrical lenses of the imaging system approximately in a direction normal to their axes. Similarly because the line height imaging lens system is symmetrical, the light emerges approximately parallel from the first series of the said two series of cylindrical lenses and therefore passes through the said third series of cylindrical lenses in a direction normal to their axes. The effect is that all the cylindrical lenses of the system are traversed by light in direction approximately normal to their axes, and therefore optical aberrations which arise in cylindrical lenses when light passes through them obliquely to their axes, are avoided.

One example of a condensing and justifying unit according to the present invention is schematically illustrated in the accompanying drawing, by way of example.

FIG. 1 is a view in sectional plan showing the optical units laid out in a straight line and FIG. 2 is a view in sectional elevation of the system shown in FIG. 1.

Referring to the drawing, 11 is a mercury vapour arc lamp, 12 is a line of characters 6 inches in length on a strip of film and 13 is a strip of film which is sensitive to U.V. light, e.g. the film manufactured by the Kalvar Corporation of New Orleans, United States of America, under the trade name "Kalfax" and on which the justified line of characters is to be reproduced.

The condensing lens system consists of lenses 14, 15 and 16, details of which are:

| Ref. No. | Type of Lens | Radius of curvature in ins. | | Thickness in ins. | Other dimensions in ins. | Axis |
|---|---|---|---|---|---|---|
| | | Convex | Concave | | | |
| 14 | Spherical Meniscus. | 2.6 | 8.3 | 0.75 | 3.75 diam | |
| 15 | Spherical Plano-convex. | 9.5 | | 1.0 | 6.5 x 4 | |
| 16 | Cylindrical Plano-convex. | 7.5 | | 0.4 | 6.5 x 4 | on 6.5. |

The justifying unit includes:

(i) A line height imaging system comprising a meniscus cylindrical lens 17, a plano-convex cylindrical lens 18 and the cylindrical surface 19a of a crossed cylindrical lens 19 and a similar set of lenses in symmetrically reversed order consisting of meniscus cylindrical lens 20, a plano-convex cylindrical lens 21 and the cylindrical surface 22a of a crossed cylindrical lens 22, the axes of the curves of the lenses 17 and 18, surface 19a, surface 22a and lenses 20 and 21 being parallel to direction of line length, and (ii) A line length imaging system comprising the cylindrical surface 19b of crossed cylindrical lens 19, a plano-convex cylindrical lens 23 and similar lenses in reversed order consisting of the lens 24 and the cylindrical surface 22b of crossed cylindrical lens 22, the axes of the lenses 23, 24 and surfaces 19b, 22b being parallel to direction of line height. The lenses 23 and 24 are fixedly mounted on a movable platform (not shown) for movement along the axis of the system and by moving the platform from the symmetrical position towards the line of characters 12 the image of the latter on the film 13 is lengthened without any change in height taking place. Moving the platform in the reverse direction shortens the image on films 13. Movement of the platform can be arranged to take place in response to a justifying signal marked on strip 12 after the line of characters has been centred on the axis of the system.

The details of the lenses forming the justifying unit are:

| Ref. No. | Radius of Curvature in ins. | | Thickness in ins. | Other dimensions in ins. | Axis |
|---|---|---|---|---|---|
| | Convex | Concave | | | |
| 17, 20 | 5.6 | 16.8 | 0.3 | 6.5 x 3 | On 3. |
| 18, 21 | 8.4 | | 0.25 | 6.5 x 3 | On 6.5. |
| 19a, 22a | 16.8 | | 0.8 (of lenses 19 and 22). | 6.5 x 3 | On 6.5. |
| 19b, 22b | 9.3 | | | 6.5 x 3 | On 3. |
| 23, 24 | 9.3 | | 0.5 | 5 x 3 | On 3. |

A nickel glass filter 25 is inserted between lenses 15 and 16 to pass light of a monochromatic or nearly monochromatic character.

It will be obvious that each of the crossed cylindrical lenses 19 and 22 may be replaced by a pair of plano-convex cylindrical lenses performing the same functions as the two lens surfaces of the crossed cylindrical lens.

The distances between the various elements of the projection system as shown in FIG. 1 are as follows:

```
                                    Ins.
a _____ 3.0.
b _____ 10.25.
c _____ 1.0 (may be varied).
d _____ 13.2.
e _____ 6.0.
f _____ 0.6.
g _____ 13.4.
h _____ 22.2.
i _____ 6.0.
```

Lens 14 may suitably be made of a heat resistant glass such as a borosilicate or zinc crown heat resistant glass and the other lenses may be made of a borosilicate or spectacle crown glass.

The distances set out above, which have been found satisfactory with one set of lenses, may have to be varied in practice with different sets of lenses made to the above specifications, depending on the glass used and the accuracy of the lenses, to obtain accurate focussing and imaging, as is well known to persons skilled in the art.

Though the various elements of the projection system of FIGURES 1 and 2 are shown arranged in a straight line, it will be obvious that by the use of a reflector or reflectors in known manner at any position other than between lenses 23 and 24, which in this case are arranged to move together, the elements may be split into two or more groups, each disposed at an angle to the preceding group.

I claim:

1. Optical means for justifying lines of characters to be projected onto a surface, said optical means consisting of an imaging lens system which is disposed between the line of characters to be justified and the said surface and comprises two similar series of cylindrical lenses of substantially identical form and focal length which have their axes parallel to the length of the line of characters and together image the line of characters on the said surface in the direction of line height, and between the said two series of cylindrical lenses, a third series of cylindrical lenses which have their axes perpendicular to the length of the line of characters and image the line in the direction of line length, at least part of the third series of cylindrical lenses being movable towards or away from the line of characters to vary the magnification in the direction of the length of the line only.

2. Optical means as claimed in claim 1, in which at least part of the said third series of cylindrical lenses is movable as a single unit.

3. Optical means as claimed in claim 1, in which the first series of said two similar series of cylindrical lenses starting from the end nearest the line of characters and preceding the said third series of cylindrical lenses consists of a meniscus cylindrical lens and a first plano-convex cylindrical lens with their convex surfaces protruding towards the said third series of cylindrical lenses and a second plano-convex cylindrical lens with its convex surface protruding towards the said first plano-convex cylindrical lens and the second series of said two similar series of cylindrical lenses consists of a similar set of three lenses in symmetrically reversed order following the said third series of cylindrical lenses.

4. Optical means as claimed in claim 3, in which the said third series of cylindrical lenses consists of four plano-convex cylindrical lenses, the first and second of these four lenses having their convex surfaces protruding towards each other and the third and fourth of these four lenses being similar to the second and first lenses respectively and having their convex surfaces protruding towards each other.

5. Optical means as claimed in claim 4, in which the second and third lenses of the third series of cylindrical lenses are movable as a single unit to vary the magnification of the line of characters on the surface onto which it is projected.

6. Optical means as claimed in claim 4, in which the third lens of the first series of said two similar series of cylindrical lenses and the first lens of said third series of cylindrical lenses are combined in the form of a crossed cylindrical lens and similarly the first lens of the second series of said two similar series of cylindrical lenses and the fourth lens of said third series of cylindrical lenses are combined in the form of a crossed cylindrical lens.

7. Optical means for projecting an image of a line of characters onto a surface comprising a light source of relatively small dimensions such as an arc lamp, a condensing lens system between the light source and the line of characters for collecting the light from a light source and rendering it approximately parallel in direction of line length while focusing it in direction of line height into a narrow strip onto the line of characters and an optical justifying system located between the line of characters and the said surface, in which said condensing lens system consists of two positive lenses with spherical curves, respectively a meniscus lens and a plano-convex lens, focusing light from the light source to give an approximately parallel beam, followed by a cylindrical lens, plano-convex, with its axis parallel to the length of the line, focusing light in direction of line height into a narrow strip, and wherein said optical justifying system consists of an imaging lens system which is disposed between the line of characters to be justified and the said surface and comprises two similar series of cylindrical lenses of substantially identical form and focal length which have their axes parallel to the length of the line of characters and together image the line of characters on the said surface in the direction of line height, and between the said two series of cylindrical lenses, a third series of cylindrical lenses which have their axes perpendicular to the length of the line of characters and image of line in the direction of line length, at least part of the third series of cylindrical lenses being movable towards or away from the line of characters to vary the magnification in the direction of the length of the line only.

References Cited in the file of this patent

UNITED STATES PATENTS

| | | |
|---|---|---|
| 2,107,305 | Ogle | Feb. 8, 1938 |
| 2,900,884 | Coleman | Aug. 25, 1959 |
| 2,915,942 | Cook | Dec. 8, 1959 |
| 2,924,145 | Landeau | Feb. 9, 1960 |
| 2,975,670 | Hemstreet | Mar. 21, 1961 |
| 2,975,671 | Hemstreet | Mar. 21, 1961 |

FOREIGN PATENTS

| | | |
|---|---|---|
| 800,893 | Great Britain | Sept. 3, 1958 |
| 1,146,999 | France | May 27, 1957 |